2,951,070
MONOAZO DYESTUFFS
William Elliot Stephen and Colin George Tilley, Manchester, England, assignors to Imperial Chemical Industries Limited, London, England, a corporation of Great Britain
No Drawing. Filed June 16, 1958, Ser. No. 742,039
Claims priority, application Great Britain June 26, 1957
5 Claims. (Cl. 260—153)

This invention relates to new monoazo dyestuffs and more particularly it relates to new monoazo dyestuffs derived from cyanuric halides.

According to the invention there are provided as new monoazo dyestuffs, the compounds represented in the free acid form by the formula:

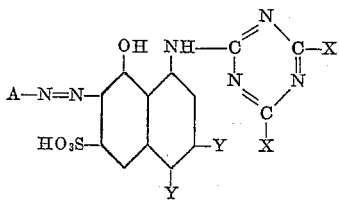

wherein A stands for a sulphonated naphthyl radical, one Y stands for a hydrogen atom and the other Y stands for either a hydrogen atom or a sulphonic acid group, and X stands for a halogen atom.

The sulphonated naphthyl radical represented by A may contain more than one sulphonic acid group. Especially valuable are the dyestuffs of the above formula when the symbol A represents a 1-sulpho-2-naphthyl radical optionally containing other sulphonic acid groups.

The new monoazo dyestuffs may be obtained by a process utilising, as starting materials, substantially equimolecular proportions of a cyanuric halide, a diazonium compound of a naphthylamine sulphonic acid and a naphthol of the formula:

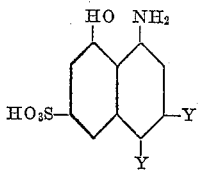

wherein Y has the meaning stated above, said process comprising interacting the naphthol with either of the other two starting materials and then reacting the product so obtained with the third starting material.

In the above process, there may be used the diazo components of such naphthylamine sulphonic acids as, for example, 1-naphthylamine-4-, 5-, 6- and 7-sulphonic acid, 1-naphthylamine-3:6- and 3:7-disulphonic acids, 2-naphthylamine-6-sulphonic acid, 2-naphthylamine-3:6-, 4:8-, 5:7- and 6:8-disulphonic acids and 2-naphthylamine-3:6:8-trisulphonic acid, but it is preferred to use the diazonium compound from 2-naphthylamine-1-sulphonic acid or a 2-naphthylamine-polysulphonic acid, containing one of the sulphonic acid groups in the 1 position.

The naphthols used in the above process of the invention may be 1-amino-8-naphthol-6-sulphonic acid, 1-amino-8-naphthol-3:6-disulphonic acid or 1-amino-8-naphthol-4:6-disulphonic acid.

The cyanuric halide used in the process may be, for example, cyanuric chloride or cyanuric bromide.

The process of the invention may be carried out by first interacting the diazonium compound with the naphthol by the methods commonly used for the manufacture of azo compounds and then treating the aminoazo compound so obtained with the cyanuric halide; alternatively the process may be carried out by first interacting the naphthol with the cyanuric halide and then using the product so obtained as a coupling component and coupling it with the diazonium compound by the methods commonly used for the manufacture of azo compounds.

In either method of performing the process of the invention, the intermediate product obtained by the first interaction may if desired be isolated and purified, before carrying out the second interaction but in general it is preferred to react the intermediate product obtained in situ with the third starting material.

In general it is preferred to use equimolecular proportions of the starting materials, but occasionally it may prove advantageous, in order to improve the yield or quality of the product, to use an excess of the cyanuric halide over the weight which is theoretically equivalent to the weight of the other reactant present.

When the naphthol is first interacted with the diazonium compound, the interaction is preferably carried out in the presence of an alkali, for example sodium carbonate. However, when the coupling is carried out as the second interaction, using as coupling component the interaction product of the cyanuric halide and the naphthol, it is preferred to use a reaction medium as weakly alkaline as will allow the coupling to take place efficiently so that side-reactions, especially the loss of halogen from the triazine nucleus, are reduced to a minimum. In general, when coupling is carried out as the second interaction, a reaction medium having a pH between 6 and 8 is preferred.

When the cyanuric halide is employed as a reactant, whether in the first or the second interaction of the process, the interaction is preferably carried out in aqueous medium at a temperature between 0° C. and 5° C. If desired, an acid-binding agent for example sodium carbonate, may be added to the medium.

It is generally preferable to isolate the new dyestuffs from the media in which they have been formed at a pH from 5 to 8 and it has been found that the loss of halogen from the triazine rings in the dyestuffs can be reduced considerably by addition of certain buffering agents which give a pH value between 5 and 8 and in particular by those which give a pH of about 6.5. Suitable buffering agents are mixtures of water-soluble acid salts of phosphoric acids or mixtures of dialkylaminoaryl sulphonic acids, containing at least 2 carbon atoms in the alkyl groups, and their alkali metal salts. The suffering agent may be added at any suitable time during the manufacture of the new dyestuffs, but a convenient procedure comprises addition of sufficient of an acid-binding agent such as sodium carbonate to the reaction mixture to give a pH between 5 and 8, then addition of buffering agent and then salt to precipitate the dyestuff, isolation of the latter by filtration and addition of more buffering agent to the dyestuff paste before drying.

The drying of the dyestuff paste is preferably carried out at a temperature below 65° C. The dried dyestuff compositions so obtained are frequently more stable than the unbuffered pastes or compositions.

The new dyestuffs of the invention, in the form of their alkali-metal salts, are readily soluble in water. They are especially useful for the colouration of cellulosic textile materials in conjunction with a treatment with an acid-binding agent, for example by the process described in Belgian specification No. 543,218, wherein the coloured textile material is after-treated with an acid-binding agent, or by related processes wherein an acid-binding agent is applied to the textile material before or during the treatment with the dyestuff.

The new monoazo dyestuffs may also be used to colour textile materials of wool, silk and other natural protein fibres and artificial fibres such as fibres of ardein, casein, polyamide and modified polyacrylonitrile, by the methods commonly used for the dyeing of such textile materials, that is by treating the textile material with a hot neutral or weakly acid aqueous solution of the dyestuff.

When so applied, the new monoazo dyestuffs give red to violet shades very fast to washing treatments and to light. Those dyestuffs of the invention obtained from a 2-naphthylamine-1-sulphonic acid as diazo component are distinguished by the resistance to bleach treatments of the shades obtained from the dyestuffs.

The invention is illustrated but not limited by the following examples in which parts and percentages are by weight:

Example 1

19.2 parts of cyanuric chloride are dissolved in 160 parts of acetone and the solution is added to a well stirred mixture of 800 parts of ice and 600 parts of water. 61.9 parts of the trisodium salt of the aminoazo compound obtained by coupling diazotized 2-naphthylamine-1-sulphonic acid under alkaline conditions with 1-amino-8-naphthol-3:6-disulphonic acid are dissolved in 1600 parts of water. This solution is neutralised to litmus and added during 50 minutes to the suspension of cyanuric chloride. The temperature of the mixture is kept below 3° C. and the mixture is stirred until no unchanged aminoazo compound can be detected. The mixture is then neutralised to litmus by the addition of approximately 50 parts of 2 normal sodium carbonate solution.

40 parts of a 1.8:1 mixture of potassium dihydrogen phosphate and disodium hydrogen phosphate are dissolved in 200 parts of water and added to the reaction mixture. Salt is then added at the rate of 15 parts of salt for every 100 parts of reaction mixture. The mixture is stirred for 30 minutes and filtered. The product on the filter is mixed with 12 parts of a 1.8:1 mixture of potassium dihydrogen phosphate and disodium hydrogen phosphate and the mixture is then washed with acetone and dried at room temperature.

The new monoazo dyestuff so obtained contains 1.88 atoms of organically-bound chlorine for each azo group. When applied to textile materials by the methods described above, it gives bluish red shades having very good fastness to washing and bleaching treatment and to light.

Example 2

A solution of 18.6 parts of cyanuric chloride in 100 parts of acetone is poured into a stirred mixture of 70 parts of water and 100 parts of ice and 2 parts of 2 normal hydrochloric acid are added to the suspension so formed. A solution of 36.3 parts of the disodium salt of 1-amino-8-hydroxynaphthalene-3:6-disulphonic acid in 160 parts of water is then added during 50 minutes. The mixture is stirred at between 0° and 5° C. and when no unchanged amino compound can be detected there is added in aqueous suspension of the diazo compound obtained from 42.6 parts of trisodium salt of 2-naphthylamine-3:6:8-trisulphonic acid in 350 to 400 parts of water. The mixture is stirred at between 5 and 10° C. and sodium carbonate is added at such a rate that the mixture is neutralised to Congo red paper in about ½ hour and then the pH value of the aqueous medium is raised to about 6.5 in a further ½ hour and then to about 7.5 in 1 hour further. Coupling is then complete and salt is added to the mixture at the rate of 20 lbs. for every 10 gallons. 19.5 parts of a 1.8:1 mixture of anhydrous potassium dihydrogen phosphate and anhydrous disodium hydrogen phosphate are also added. The mixture is stirred for 1 hour and then the precipitate is filtered off, mixed with 11.7 parts of a 1.8:1 mixture of anhydrous potassium dihydrogen and disodium hydrogen phosphates and dried at a temperature below 45° C.

The new monoazo dyestuff so obtained contains 1.86 organically-bound chlorine atoms for each azo group present. When applied to textile materials by the methods described above it gives bright bluish red shades having very good fastness to washing and to light.

The following table describes further examples of new monoazo dyestuffs of the invention obtained by the methods described in Examples 1 and 2 above using the diazonium compound of the amine named in the first column (diazo component), the naphthol named in the second column, and the cyanuric halide named in the third column. The shades obtained from the dyestuffs are named in the fourth column.

| Diazo Component | Naphthol | Cyanuric Halide | Shade |
|---|---|---|---|
| (3) 2-naphthylamine-3:6-disulphonic acid. | 1-amino-8-naphthol-3:6-disulphonic acid. | cyanuric chloride. | bluish red. |
| (4) 2-naphthylamine-4:8-disulphonic acid. | ----do---- | ---do--- | Do. |
| (5) 2-naphthylamine-5:7-disulphonic acid. | ----do---- | ---do--- | Do. |
| (6) 2-naphthylamine-6:8-disulphonic acid. | ----do---- | ---do--- | Do. |
| (7) 2-naphthylamine-1:5-disulphonic acid. | ----do---- | ---do--- | Do. |
| (8) 2-naphthylamine-6-sulphonic acid. | ----do---- | ---do--- | Do. |
| (9) 1-naphthylamine-4-sulphonic acid. | ----do---- | ---do--- | violet. |
| (10) 1-naphthylamine-5-sulphonic acid. | ----do---- | ---do--- | red violet. |
| (11) 1-naphthylamine-6-sulphonic acid. | ----do---- | ---do--- | Do. |
| (12) 1-naphthylamine-7-sulphonic acid. | ----do---- | ---do--- | Do. |
| (13) 1-naphthylamine-3:6-disulphonic acid. | ----do---- | ---do--- | Do. |
| (14) 1-naphthylamine-3:7-disulphonic acid. | ----do---- | ---do--- | Do. |
| (15) 2-naphthylamine-1:5:7-trisulphonic acid. | ----do---- | ---do--- | bluish red. |
| (16) 2-naphthylamine-3:6-disulphonic acid. | 1-amino-8-naphthol-4:6-disulphonic acid. | ---do--- | Do. |
| (17) 2-naphthylamine-1:5-disulphonic acid. | ----do---- | ---do--- | Do. |
| (18) 2-naphthylamine-1:5-disulphonic acid. | 1-amino-8-naphthol-6-sulphonic acid. | ---do--- | Do. |

What we claim is:

1. Monoazo dyestuffs which are represented in the free acid form by the formula:

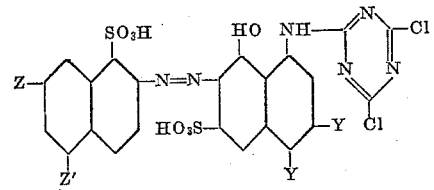

wherein one Y stands for a hydrogen atom and the other Y stands for a member selected from the class consisting of a hydrogen atom and a sulfo group, Z and Z' are independently selected from the class consisting of a hydrogen atom and a sulfo group.

2. The dyestuff of claim 1 wherein Z is hydrogen and Z' is a sulfo group.

3. The dyestuff of claim 1 wherein Z' is hydrogen and Z is a sulfo group.

4. The dyestuff of claim 1 wherein each of Z and Z' is a sulfo group.

5. The dyestuff of claim 1, wherein each of Z and Z' is a hydrogen atom.

References Cited in the file of this patent

UNITED STATES PATENTS

| | | |
|---|---|---|
| 1,667,312 | Fritzsche et al. | Apr. 24, 1928 |
| 2,273,115 | Kracker et al. | Feb. 17, 1942 |

FOREIGN PATENTS

| | | |
|---|---|---|
| 774,925 | Great Britain | May 15, 1957 |
| 1,139,796 | France | Feb. 18, 1952 |